US012672126B2

(12) United States Patent
Fu et al.

(10) Patent No.: US 12,672,126 B2
(45) Date of Patent: Jun. 30, 2026

(54) METHOD AND DEVICE FOR DETERMINING TRANSMISSION RESOURCES

(71) Applicant: Samsung Electronics Co., Ltd., Gyeonggi-do (KR)

(72) Inventors: Jingxing Fu, Beijing (CN); Feifei Sun, Beijing (CN)

(73) Assignee: Samsung Electronics Co., Ltd. (KR)

( * ) Notice: Subject to any disclaimer, the term of this patent is extended or adjusted under 35 U.S.C. 154(b) by 386 days.

(21) Appl. No.: 18/119,412

(22) Filed: Mar. 9, 2023

(65) Prior Publication Data

US 2023/0292308 A1    Sep. 14, 2023

(30) Foreign Application Priority Data

Mar. 11, 2022    (CN) .......................... 202210239380.9

(51) Int. Cl.
  *H04W 72/12*      (2023.01)
  *H04W 72/1263*    (2023.01)
(52) U.S. Cl.
  CPC ............................... *H04W 72/1263* (2013.01)
(58) Field of Classification Search
  CPC ............. H04W 72/23; H04W 72/0446; H04W 72/232; H04W 72/1273; H04W 74/0833; H04L 5/0053; H04L 5/0094; H04L 5/0048; H04L 5/0057; H04L 1/0003; H04L 1/0025; H04B 7/0486; H04B 7/0626
  See application file for complete search history.

(56) References Cited

U.S. PATENT DOCUMENTS

| | | | |
|---|---|---|---|
| 2015/0009927 A1* | 1/2015 | Larsson | H04W 72/23 370/329 |
| 2016/0135076 A1* | 5/2016 | Grinshpun | H04W 28/0284 370/252 |
| 2018/0097673 A1 | 4/2018 | Nangia et al. | |
| 2019/0327018 A1 | 10/2019 | Tang et al. | |
| 2019/0357001 A1* | 11/2019 | Kang | H04W 4/02 |
| 2020/0059320 A1* | 2/2020 | Kim | H04L 1/189 |
| 2020/0059906 A1 | 2/2020 | Gupta et al. | |
| 2020/0275482 A1* | 8/2020 | Oh | H04W 74/0825 |
| 2020/0374851 A1 | 11/2020 | Zhou et al. | |
| 2021/0211219 A1* | 7/2021 | Sarkis | H04L 1/0041 |
| 2021/0226760 A1* | 7/2021 | Ye | H04L 5/0046 |
| 2021/0235451 A1* | 7/2021 | Parekh | H04W 72/04 |

(Continued)

FOREIGN PATENT DOCUMENTS

| | | | | |
|---|---|---|---|---|
| EP | 3 843 305 | 6/2021 | | |
| WO | WO-2021029440 A1 * | 2/2021 | ........... | H04L 1/0003 |

OTHER PUBLICATIONS

International Search Report dated Jun. 9, 2023 issued in counterpart application No. PCT/KR2023/003273, 9 pages.

(Continued)

*Primary Examiner* — Khalid W Shaheed
(74) *Attorney, Agent, or Firm* — The Farrell Law Firm, P.C.

(57)        ABSTRACT

The disclosure relates to a 5G or 6G communication system for supporting a higher data transmission rate. A method performed by a UE ire a wireless communication system is provided. The method includes receiving indication information related to a TBS and determining the TBS based on the indication information.

12 Claims, 13 Drawing Sheets

(56)          References Cited

U.S. PATENT DOCUMENTS

2021/0321414 A1    10/2021  Yeo et al.
2021/0352527 A1    11/2021  Sridharan et al.
2022/0329364 A1*   10/2022  Lee ...................... H04W 72/23

OTHER PUBLICATIONS

Ericsson, "On DL/UL Resource Allocation", R1-1716594, 3GPP
TSG RAN1 WG1 Meeting NR#3, Sep. 18-21, 2017, 14 pages.
European Search Report dated Feb. 23, 2026 issued in counterpart
application No. 23767194.6-1206, 12 pages.

* cited by examiner

| Receive indication information | ~S510 |

| Determine a TBS of a PDSCH according to the received indication information | ~S520 |

| Receive the PDSCH according to the determined TBS | ~S530 |

METHOD AND DEVICE FOR DETERMINING TRANSMISSION RESOURCES

CROSS-REFERENCE TO RELATED APPLICATION(S)

This application is based on and claims priority under 35 U.S.C. § 119(a) to Chinese Patent Application No. 202210239380.9, which was filed with the China National Intellectual Property Administration on Mar. 11, 2022, the entire disclosure of which is incorporated herein by reference.

BACKGROUND

1. Field

The present disclosure relates generally to wireless communication, and more particularly, to a method and device for determining transmission resources.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and hroadbands, definition and operation of BWP (BandWidth Part), new channel coding methods such as an LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer is standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated. Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RAM for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure is provided to address at least the above-mentioned problems and/or disadvantages and to provide at least the advantages described below.

According to an embodiment, a method performed by a UE in a wireless communication system is provided. The method includes receiving indication information related to a transmission block size (TBS) and determining the TBS based on the indication information.

According to an embodiment, a method performed by a base station (BS) in a wireless communication system is provided. The method comprises transmitting, to a UE, indication information related to a TBS. The indication information is used by the UE to determine the TBS.

According to an embodiment, a UE in a wireless communication system is provided. The UE comprises a transceiver and a controller coupled to the transceiver and configured to receive indication information related to a TBS, and determine the TBS based on the indication information.

According to an embodiment, a BS in a wireless communication system is provided. The BS comprises a transceiver and a controller coupled to the transceiver and configured to transmit, to a UE, indication information related to a TBS. The indication information is used by the UE to determine the TBS.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
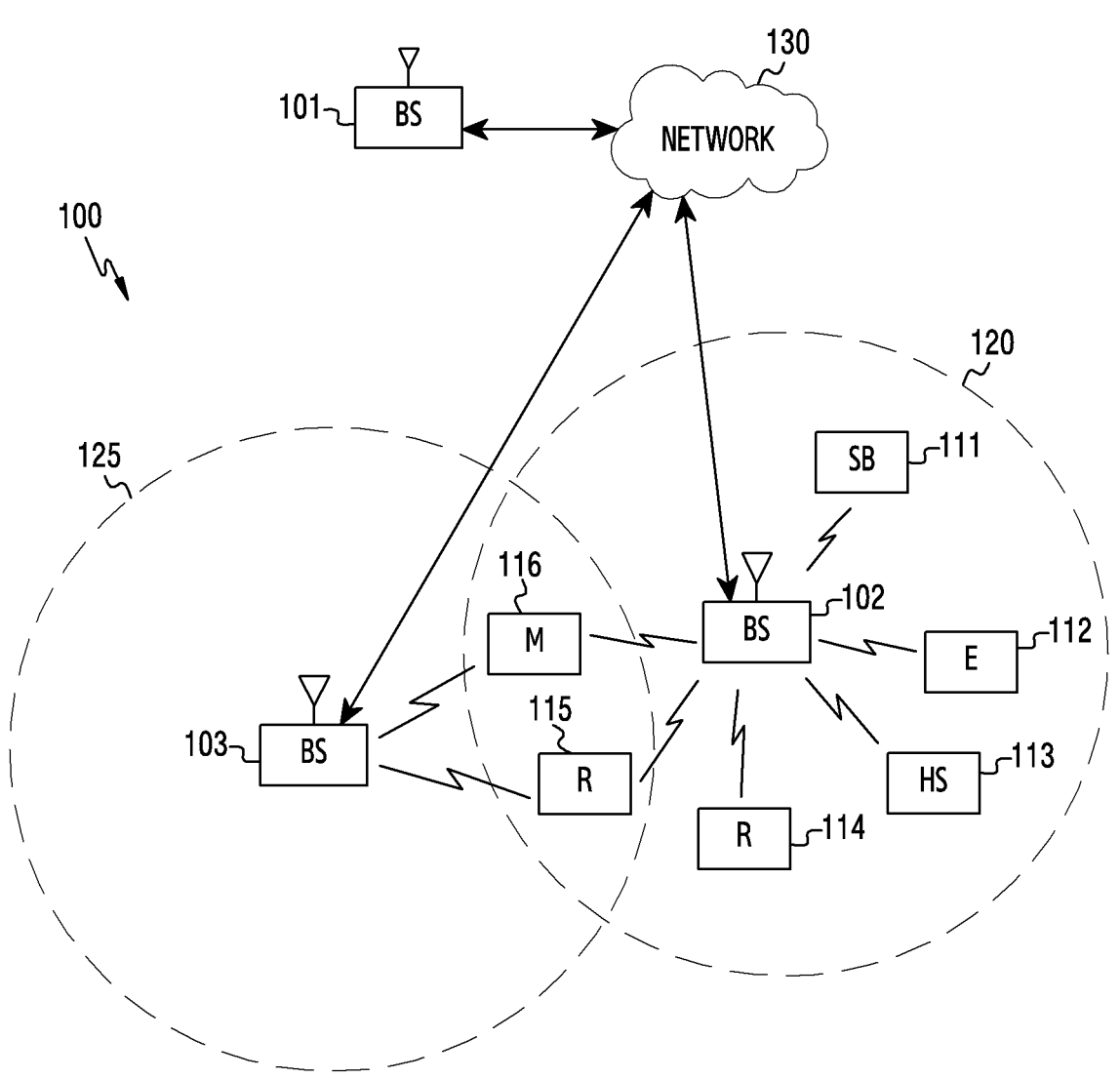
FIG. 1 illustrates a wireless network according to an embodiment.

The following description with reference to the accompanying drawings is provided to facilitate a comprehensive understanding of various embodiments of the present disclosure defined by the claims and their equivalents. The description includes various specific details to facilitate understanding but should only be considered as exemplary. Therefore, those skilled in the art will recognize that various changes and modifications may be made to the various embodiments described herein without departing from the scope and spirit of the present disclosure. In addition, for clarity and conciseness, the description of well-known functions and structures may be omitted.

Terms and expressions used in the following specification and claims are not limited to their dictionary meanings, but are only used by the inventors to enable a clear and consistent understanding of the present disclosure. Therefore, it should be obvious to those skilled in the art that the following description of various embodiments of the present disclosure are provided only for the purpose of illustration and not for the purpose of limiting the present disclosure as defined by the appended claims and their equivalents.

Herein, singular forms of "a", "an", and "the" include plural referents, unless the context clearly indicates otherwise. Thus, for example, references to "a component surface" include references to one or more such surfaces.

The term "include" or "may include" refers to the existence of corresponding disclosed functions, operations or components that may be used in various embodiments of the present disclosure, rather than limiting the existence of one or more additional functions, operations or features. In addition, the term "include" or "have" can be interpreted to indicate certain features, numbers, steps, operations, constituent elements, components or combinations thereof, but should not be interpreted to exclude the possibility of the existence of one or more other features, numbers, steps, operations, constituent elements, components or combinations thereof.

The term "or" includes any listed terms and all combinations thereof. For example, "A or B" may include A, B, or both A and B.

Unless otherwise defined, all terms (including technical terms or scientific terms) used in this disclosure have the same meanings as those understood by those skilled in the art as described in this disclosure. Common terms as defined in dictionaries are interpreted to have meanings consistent with the context in relevant technical fields, and they should not be interpreted as idealized or excessively formally, unless explicitly defined as such in the disclosure.

In order to meet the increasing demand for wireless data communication services since the deployment of $4^{th}$ generation (4G) communication systems, efforts have been made to develop improved 5G or pre-5G communication systems. 5G or pre-5G communication systems may also be referred to as "beyond 4G networks" or "post-long term evolution (LTE) systems".

In order to achieve a higher data rate, 5G communication systems are implemented is in higher frequency (millimeter, mmWave) bands, 60 GHz bands. In order to reduce propagation loss of radio waves and increase a transmission distance, technologies such as beamforming, massive MIMO, FD-MIMO, array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid frequency shift keying (FSK) and quadrature amplitude modulation (QAM) (FQAM) and sliding window superposition coding (SWSC) have been developed as advanced coding modulation (ACM), and filter bank multicarrier (FBMC), non-orthogonal multiple access (NOMA), sparse code multiple access (SCMA) and reconfigurable intelligent surface (RIS) have been developed as advanced access technologies.

FIG. 1 illustrates a wireless network according to various embodiments of the present disclosure. The embodiment of the wireless network 100 shown in FIG. 1 is for illustration only. Other embodiments of the wireless network 100 may be used without departing from the scope of the present disclosure.

Referring to FIG. 1, a wireless network 100 includes a BS, e.g., a gNodeB (gNB), 101, a gNB 102, and a gNB 103. The gNB 101 communicates with gNB 102 and gNB 103. The gNB 101 also communicates with at least one Internet protocol (IP) network 130, such as the Internet, a private IP network, or other data networks.

Depending on a type of the network, other well-known terms for a BS, such as "access point", may be used instead of gNB. For convenience, the term gNB is used herein to refer to network infrastructure components that provide wireless access for remote terminals.

Similarly, depending on the type of the network, other well-known terms such as "mobile station", "user station", "remote terminal", "wireless terminal", "user apparatus", etc., may be used instead of UE. For convenience, the term UE is used herein to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to a network 130 for a first plurality of UEs within a coverage area 120 of the gNB 102. The first plurality of UEs include a UE 111, e.g., which is located in a small business (SB), a UE 112, e.g., which is located in an enterprise (E), a UE 113, e.g., which is located in a WiFi hotspot (HS), a UE 114, e.g., which is located in a first residence (R), a UE 115, e.g., which is located in a second residence (R), a UE 116, e.g., which is a mobile device (M), such as a cellular phone, a wireless laptop computer, a wireless personal digital assistance (PDA), etc.

The gNB 103 provides wireless broadband access to the network 130 for a second plurality of UEs within a coverage area 125 of the gNB 103. The second plurality of UEs include a UE 115 and a UE 116. One or more of the gNBs 101-103 may communicate with each other and with UEs 111-116 using 5G, Long Term Evolution (LTE), LTE-advanced (A), WiMAX, or another wireless communication technology.

The dashed lines in FIG. 1 represent approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs 103 and 102 and changes in the radio environment associated with natural obstacles and man-made obstacles.

One or more of the gNB 101, the gNB 102, and the gNB 103 may include a 2-dimensional (2D) antenna array. One or more of the gNB 101, the gNB 102, and the gNB 103 may support codebook designs and structures for systems with 2D antenna arrays.

Alternatively, the wireless network 100 may include any number of gNBs and any number of UEs in any suitable arrangement. Further, the gNB 101 may directly communicate with any number of UEs and provide wireless broadband access to the network 130 for those UEs. Similarly, each of the gNBs 102-103 may directly communicate with the network 130 and provide direct wireless broadband access to the network 130 for the UEs. In addition, the gNBs 101, 102 and/or 103 may provide access to other or additional external networks, such as external telephone networks or other types of data networks.

Figure 2A:
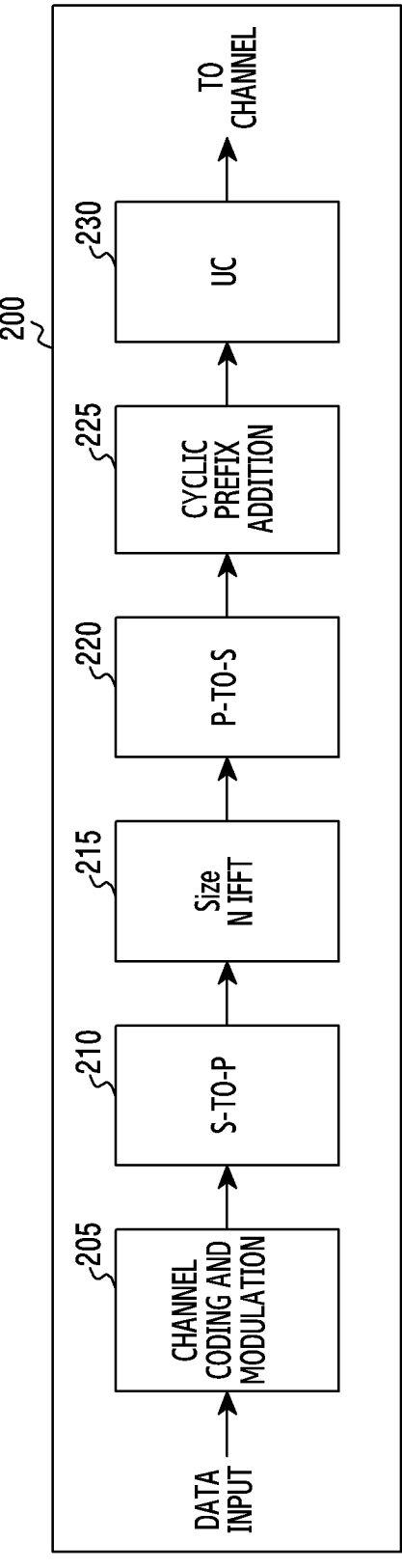
FIG. 2A illustrates wireless transmission path according to an embodimennt.
Figure 2B:
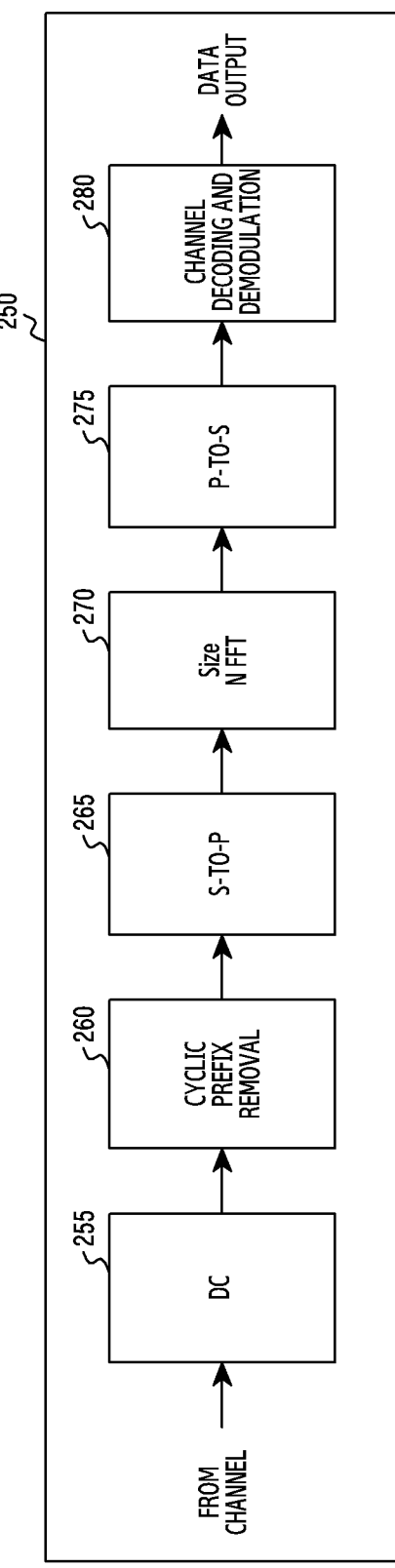
FIG. 2B example wireless reception path according to an embodiment.

FIG. 2A illustrates a wireless transmission path according to an embodiment. FIG. 2B illustrates a wireless reception path according to an embodiment.

Referring to FIGS. 2A and 2B, a transmission path 200 may be described as being implemented in a gNB, e.g., the gNB 102 of FIG. 1, and the reception path 250 may be described as being implemented in UE, e.g., the UE 116 of FIG. 1. However, it should be understood that the reception path 250 may be implemented in a gNB and the transmission path 200 may be implemented in a UE. The reception path 250 may be configured to support codebook designs and structures for systems with 2D antenna arrays.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, an S-to-P block 265, a size N fast Fourier transform (FTT) block 270, a P-to-S block 275, and a channel decoding and demodulation block 280.

In the transmission path 200, the channel coding and modulation block 205 receives a set of information bits, applies coding (such as Low Density Parity Check (LDPC) coding), and modulates the input bits (e.g., using quadrature phase shift keying (QPSK) or Quadrature Amplitude Modulation (QAM)) to generate a sequence of frequency-domain modulated symbols. The S-to-P block 210 converts (e.g., demultiplexes) serial modulated symbols into parallel data to generate N parallel symbol streams, where N is a size of the IFFT/FFT used in the gNB 102 and the UE 116. The size N IFFT block 215 performs IFFT operations on the N parallel symbol streams to generate a time-domain output signal. The P-to-S block 220 converts (e.g., multiplexes) parallel time-domain output symbols from the size N IFFT block 215 to generate a serial time-domain signal. The cyclic prefix addition block 225 inserts a cyclic prefix into the time-domain signal. The UC 230 modulates (e.g., up-converts) the output of the cyclic prefix addition block 225 to a radio frequency (RF) for transmission via a wireless channel. The signal may also be filtered at a baseband before switching to the RF frequency.

The RF signal transmitted from the gNB 102 arrives at the UE 116 after passing through the wireless channel, and operations in reverse to those at gNB 102 are performed at the UE 116.

More specifically, the down-converter 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signal. The P-to-S block 275 converts the parallel frequency-domain signal into a sequence of modulated data symbols. The channel decoding and demodulation block 280 demodulates and decodes the modulated symbols to recover the original input data stream.

Each of the gNBs 101-103 may implement the transmission path 200 similar to that to for transmitting to the UEs 111-116 in the DL, and may implement the reception path 250 similar to that for receiving from the UEs 111-116 in the UL. Similarly, each of the UEs 111-116 may implement the transmission path 200 for transmitting to the gNBs 101-103 in the UL, and may implement the reception path 250 for receiving from the gNBs 101-103 in the DL.

Each of the components illustrated in FIGS. 2A and 2B may be implemented using hardware, or using a combination of hardware and software/firmware. That is, at least some of the components in FIGS. 2A and 2B may be implemented in software, while other components may be implemented in configurable hardware or a combination of software and configurable hardware. For example, the FFT block 270 and the IFFT block 215 may be implemented as configurable software algorithms, in which the value of the size N may, be modified according to the implementation.

Although described as using FFT and IFFT, the scope of the disclosure is not limited thereto. Other types of transforms may be used, such as discrete Fourier transform (DFT) and Inverse Discrete Fourier Transform (IDFT) functions. For DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Alternatively, various components in FIGS. 2A and 2B may be combined, further subdivided or omitted, and additional components may be added according to specific requirements. Furthermore, FIGS. 2a and 2b are intended to illustrate examples of types of transmission and reception paths that may be used in a wireless network. Any other suitable architecture may be used to support wireless communication in a wireless network.

Figure 3A:
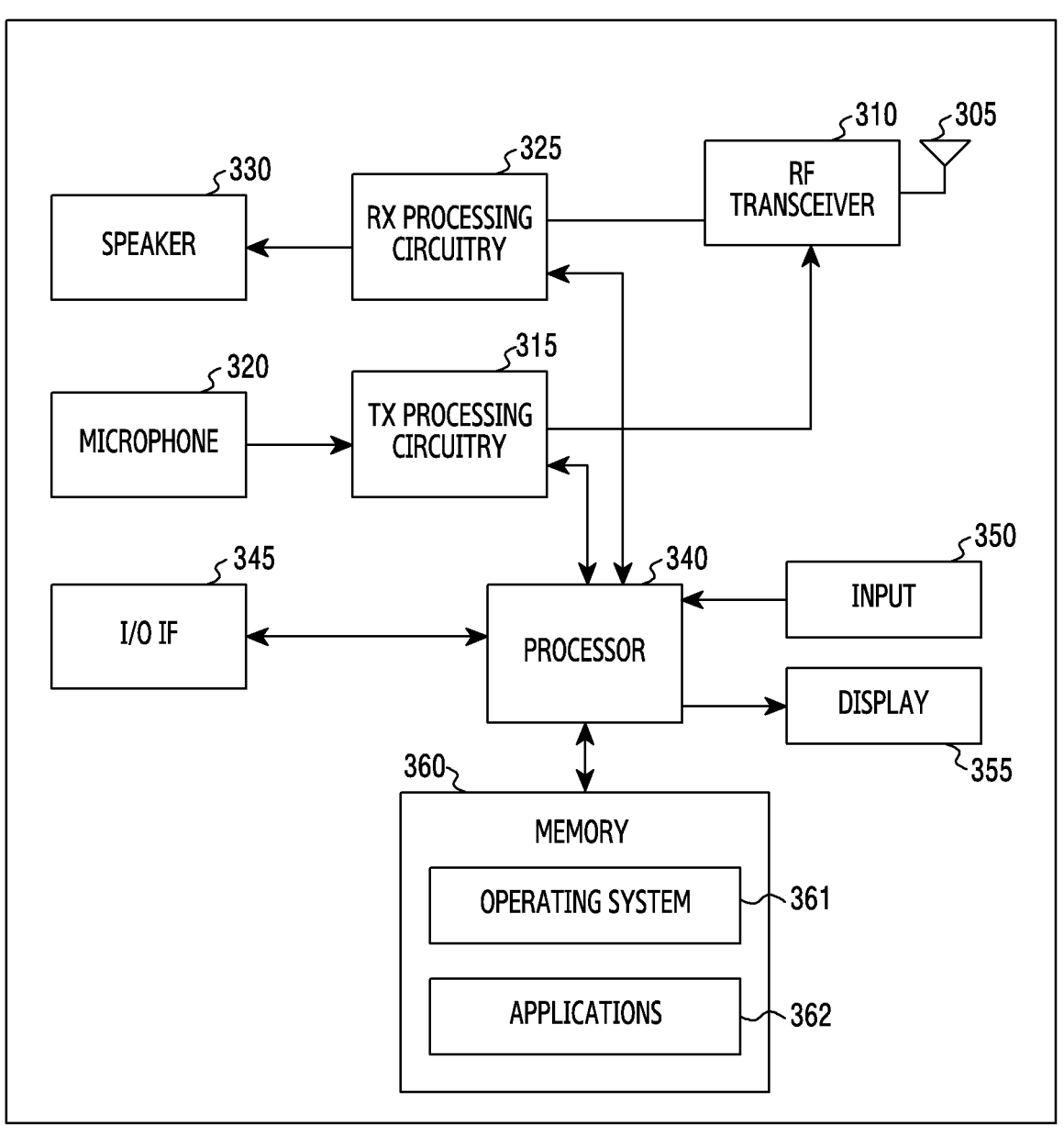
FIG. 3A illustrates a UE according to an embodiment.

FIG. 3A illustrates a UE according to an embodiment. For example, at least one of UEs 111-116 of FIG. 1 may have the same or similar configuration illustrated in FIG. 3A.

Referring to FIG. 3A, the UE includes an antenna 305, an RF transceiver 310, a transmission (TX) processing circuit 315, a microphone 320, and a reception (RX) processing circuit 325. The UE also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives, via the antenna 305, an incoming RF signal transmitted by a gNB of a wireless network. The RF transceiver 310 down-converts the incoming RE signal to generate an intermediate frequency (IF) or baseband signal. The IF or baseband signal is transmitted to the RX processing circuit 325, which generates a processed baseband signal by filtering, decoding, and/or digitizing the baseband or IF signal. The RX processing circuit 325 transmits the processed baseband signal to the speaker 330 (e.g., for voice data) or to the processor/controller 340 for further processing (e.g., for web browsing data).

The TX processing circuit 315 receives analog or digital voice data from microphone 320 or other outgoing baseband data (e.g., network data, email, or interactive video game data) from the processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 may include one or more processors or other processing devices and may execute the OS 361 stored in the memory 360 in order to control the overall operation of the UE. For example, the processor/controller 340 may control the reception of forward channel signal and the transmission of backward channel signal through the RF transceiver 310, the RX processing circuit 325, and the TX processing circuit 315. The processor/controller 340 may include at least one microprocessor or microcontroller.

The processor/controller 340 is also capable of executing other processes and programs residing in the memory 360, such as operations for channel quality measurement in and reporting for systems with 2D antenna arrays. The processor/controller 340 may move data into or out of the memory 360 for an execution process. The processor/controller 340 may be configured to execute the application 362 based on the OS 361 or in response to a signal received from the gNB or the operator. The processor/controller 340 is also coupled to the I/O interface 345, which provides the UE with the ability to connect to other devices such as laptop computers and handheld computers. The I/O interface 345 is a communication path between these accessories and the processor/controller 340.

The processor/controller 340 is also coupled to the input device(s) 350 and the display 355. An operator of the UE may input data into the UE using the input device(s) 350, The display 355 may be a liquid crystal display (LCD) or other display capable of presenting text and/or at least limited graphics (e.g., from a website). The memory 360 is coupled to the processor/controller 340. The memory 360 may include a random access memory (RAM), and a flash memory or other read-only memory (ROM).

Alternatively, various components illustrated in FIG. 3A may be combined, further subdivided, or omitted, and additional components may be added according to specific requirements. For example, the processor/controller 340 may be divided into a plurality of processors, such as one or more central processing units (CPUs) and one or more graphics processing units (GPUs). Further, although FIG. 3A illustrates that the UE being configured as a mobile phone or a smart phone, a UE may be configured to operate as another type of mobile or fixed device.

Figure 3B:
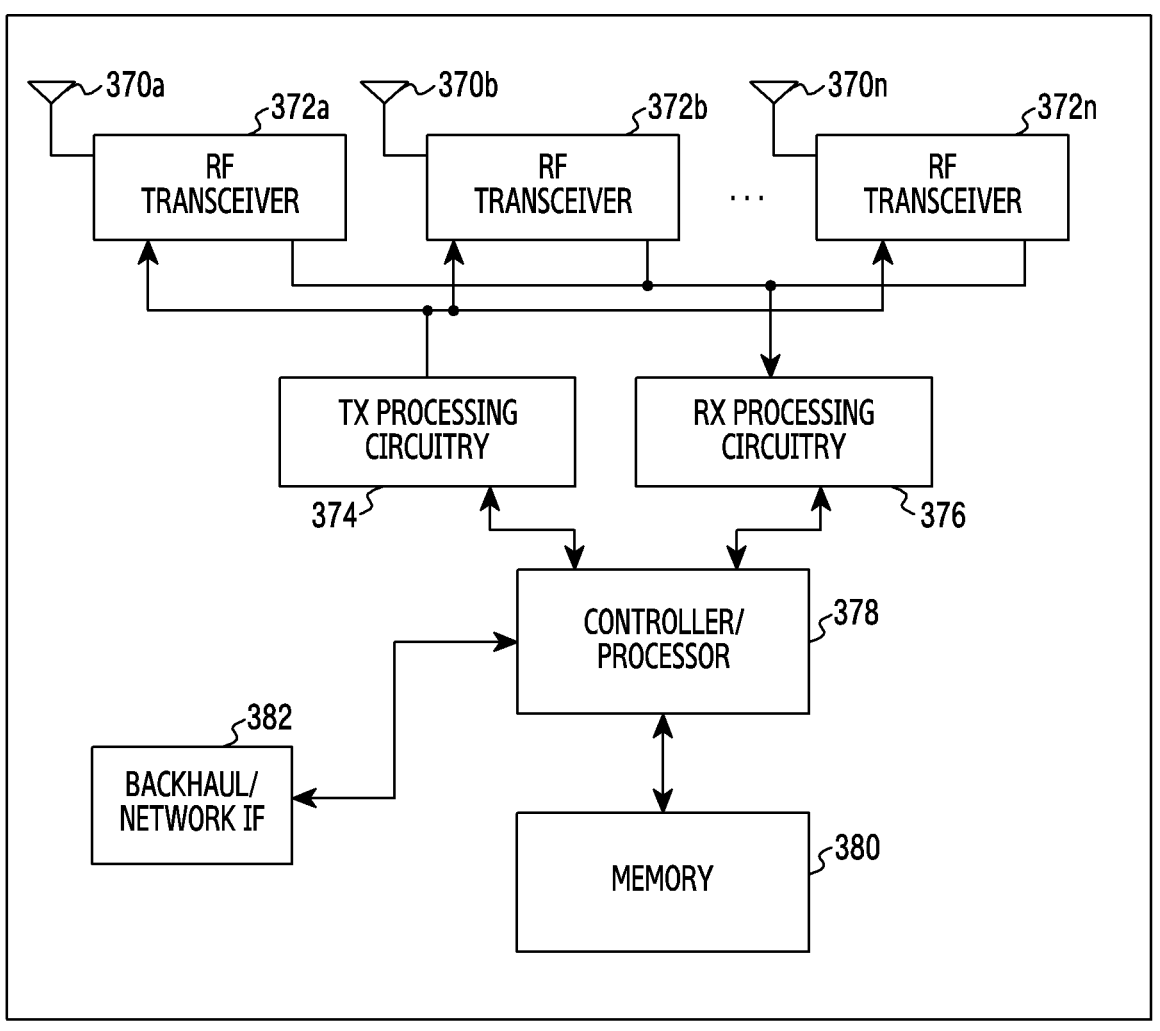
FIG. 3B illustrates a BS according to an embodiment.

FIG. 3B illustrates a BS according to an embodiment. For example, at least one of the gNBs 101-103 of FIG. 1 may have the same or similar configuration illustrated in FIG. 3B. However, a gNB has various configurations, and FIG. 3h does not limit the scope of the present disclosure to any specific implementation of a gNB. It should be noted that gNB 101 and gNB 103 may include the same or similar structures as gNB 102.

Referring to FIG. 3B, the BS includes a pluralityof antennas 370a-370n, a plurality of RF transceivers 372a-372n, a TX processing circuit 374, and a RX processing circuit 376, One or more of the antennas 370a-370n may include a 2D antenna array.

The BS also includes a controller/processor 378, a memory 380, and a backhaul or network interface 382.

The RF transceivers 372a-372n receive an incoming RF signal from the antennas 370a-370n, such as a signal transmitted by UEs or other BSs (or gNBs). The RF transceivers 372a-372n down-convert the incoming RF signal to generate an IF or baseband signal. The IF or baseband signal is transmitted to the RX processing circuit 376, which generates a processed baseband signal by filtering, decoding, and/or digitizing the baseband or IF signal. The RX processing circuit 376 transmits the processed baseband signal to the controller/processor 378 for further processing.

The TX processing circuit 374 receives analog or digital data (e.g., voice data, network data, email, or interactive video game data) from the controller/processor 378. The TX processing circuit 374 encodes, multiplexes, and/or digitizes outgoing baseband data to generate a processed baseband or IF signal. The RF transceivers 372a-372n receive the outgoing processed baseband or IF signal from the TX processing circuit 374 and up-convert the baseband or IF signal into an RF signal transmitted via the antennas 370a-370n.

The controller/processor 378 may include one or more processors or other processing devices that control the overall operation of the BS. For example, the controller/ processor 378 may control the reception of forward channel signal and the transmission of backward channel signal through the RF transceivers 372a-372n, the RX processing circuit 376, and the TX processing circuit 374. The controller/processor 378 may also support additional functions, such as higher-level wireless communication functions. For example, the controller/processor 378 may perform a blind interference sensing (BIS) process using a BIS algorithm, and decode a received signal from which an interference signal is subtracted. A controller/processor 378 may support any of a variety of other functions in the BS. The controller/processor 378 may include at least one microprocessor or microcontroller.

The controller/processor 378 may execute programs and other processes residing in the memory 380, such as an OS. The controller/processor 378 may also support channel quality measurement and reporting for systems with 2D antenna arrays. The controller/processor 378 supports communication between entities such as web real-time communications (RTCs). The controller/processor 378 may move data into or out of the memory 380 as required by an execution process.

The controller/processor 378 is also coupled to the backhaul or network interface 382. The backhaul or network interface 382 allows the BS to communicate with other devices or systems through a backhaul connection or through a network. The backhaul or network interface 382 may support communication over any suitable wired or wireless connection(s). For example, when the BS is implemented as a part of a cellular communication system, such as a cellular communication system supporting 5G or NR access technology, LTE, or LTE-A, the backhaul or network interface 382 may allow the BS to communicate with other BSs (or gNBs) through wired or wireless backhaul connections. When the BS is implemented as an access point, the backhaul or network interface 382 may allow the BS to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. The memory 380 may include an RAM and a flash memory or ROM. A plurality of instructions, such as the BIS algorithm, may be stored in the memory. For example, the plurality of instructions are configured to cause the controller/processor 378 to execute the BIS process and decode the received signal after subtracting at least one interference signal determined by the BIS algorithm.

The transmission and reception paths of the BS (implemented using RE transceivers to 372a-372n, TX processing circuit 374 and/or RX processing circuit 376) support aggregated communication with frequency division duplex (FDD) cells and time division duplex (TDD) cells.

Alternatively, the BS may include different numbers of the components illustrated in FIG. 3B. For example, the access point may include many backhaul or network interfaces 382, and the controller/processor 378 may support routing functions to route data between different network addresses. As another example, the BS may include multiple TX processing circuits 374 (e.g., one for each RF transceiver) and a single RX processing circuit 376.

The exemplary embodiments of the present disclosure are further described below with reference to the accompanying drawings.

Texts and drawings are only provided as examples to help readers understand the present disclosure. They are not intended and should not be construed to limit the scope of the present disclosure in any way. Although some embodiments and examples have been provided, based on the disclosure herein, it is obvious to those skilled in the art that changes may be made to the illustrated embodiments and examples without departing from the scope of this disclosure.

Communication systems are generally divided into TDD and FDD systems. In a TDD system, a BS may configure UL and DL attributes in different time resources on a carrier by semi-static signaling and dynamic signaling, namely UL transmission slots/symbols, DL transmission slots/symbols, and flexible slots/symbols. In an FDD system, the BS may configure different time resources of a UL carrier as UL transmission slots/symbols or flexible slots/symbols, and different time resources of a DL carrier as DL transmission slots/symbols or flexible slots/symbols among a pair of the UL carrier and the DL carrier, respectively.

Compared with the FDD system, in the TDD system, since UL transmission and DL to transmission are time division multiplexed, the time delay of UL transmission or DL transmission may be relatively large. For example, according to a UL and DL configuration, in a period of 10 ms (millisecond), only a slot 1 ms is UL transmission, while other slots are DL transmission or flexible transmission, and the maximum delay of UL transmission is 10 ms. In order to reduce the transmission delay, a part of frequency domain resources in a carrier may be divided into UL transmission resources and the other part of resources may be divided into DL transmission resources. In order to reduce the mutual influence of UL and DL transmissions in the same carrier, the mutual interference between UL and DL may be reduced by setting a guard interval, filtering, etc. Further, a part of frequency domain resources in a carrier may be used for both UL transmission and DL transmission, so as to improve the resource utilization.

According to an embodiment, a method and apparatus are provided for improving resource allocation and a transmission mode of UL and DL signals based on a new UL and DL transmission mode, thereby improving the system efficiency.

In a TDD system, the BS may indicate that a slot or symbol is a UL symbol, a DL symbol, or a flexible transmission symbol, and the UE determines UL and DL transmission directions of each symbol/slot of a carrier/serving cell according to the indicated information. Generally, in the same symbol of a carrier/serving cell, only one direction of transmission is supported, i.e., UL transmission Or DL transmission is supported, so the BS only needs to indicate the UL and DL transmission directions in time dimension. The BS may indicate periodically, e.g., indicate a periodic slot configuration by high-layer signaling, or a slot format within a period of time by dynamic signaling.

According to the slot configuration/format, the UL and DL attributes of each frequency domain resource in each slot/symbol may be determined as being for UL transmission, for DL transmission, or for flexible transmission. The flexible slot/symbol may be used for UL transmission or DL transmission or both, but may only he transmitted for one direction at a certain moment.

In an FDD system, the BS may indicate a UL or flexible transmission symbol/slot for a UL carrier/serving cell, and a DL or flexible transmission symbol/slot for a DL canier/serving cell. A first type of cell-common UL/DL information may include information of UL and DL attributes in time dimension, and the first type of cell-common UL/DL information may be used to indicate a period and which slots/symbols in the period are UL, DL or flexible slots/symbols respectively, and the indicated UL and DL attributes are applicable to all frequency domain resources in each slot/symbol of this cell, i.e., all frequency domain resources within the bandwidth of this carrier/serving cell have the same UL and DL attributes in a slot/symbol.

In order to allocate UL and DL transmission resources more efficiently, the granularity of UL and DL transmission resources may be further reduced from a symbol/slot to a part of frequency domain resources within the symbol/slot by a second type of configuration information, i.e., different frequency domain resources in a symbol of a carrier/serving cell may be allocated with different transmission directions. The second type of configuration information includes a second type of cell-common UL/DL information and UE-specific UL/DL information. The second type of cell-common UL/DL information may include information of UL and DL attributes in time dimension and frequency domain dimension, and the second type of cell-common UL/DL information may be used to indicate which frequency domain resources of which slots/symbols are resources for UL, DL or flexible transmission. Alternatively, the second type of common UL/DL information may be used to indicate which frequency domain resources of which slots/symbols are resources for UL, DL or resources unavailable for transmission. For the same time-frequency resources, the BS may also allocate UL and DL transmission at the same time to implement full duplex multiplexing. The BS may also configure user-specific UL DL information, e.g., user-specific UL/DL information for each serving cell of the UE or user-specific UL/DL information for each BWP of the UE. According to the configured user-specific UL/DL information of the UE, the UE may determine that a part of frequency domain resources are UL transmission resources and a part of frequency domain resources are DL transmission resources, within a symbol or slot, as illustrated in FIG. 4.

Although the frequency domain resources in a symbol or slot are used as an example in the above and following descriptions, methods described herein are not limited to the frequency domain resources in a symbol or slot, but may also be applied to the frequency is domain resources in other suitable time units. For example, the disclosure may be applied to a scenario in which a part of frequency domain resources are UL transmission resources and another part of frequency domain resources are DL transmission resources within a time unit, wherein the time unit may include symbols) or slot(s), but is not limited thereto, e.g., may also be other time unit(s).

Figure 4:
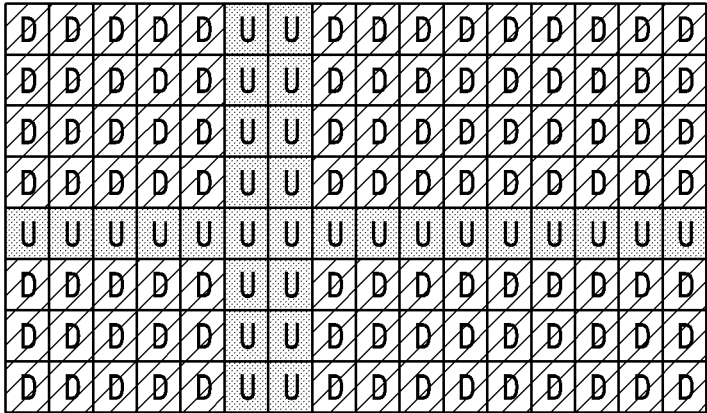
FIG. 4 illustrates uplink (UL) resources and downlink (DL) resources in a certain time unit.

FIG. 4 illustrates UL resources and DL resources in a certain time unit.

Referring to FIG. 4, a UL BWP includes a DL physical resource block (PRB) or DL resource element (RE), or the DL BWP includes a UL PRB or UL RE. The problem is that some PRBs indicated by frequency domain resource assignment (FDRA) are actually unavailable, which may affect data reception performance.

For example, a number of PRBs for transmitting data is the number of PRBs indicated by the FDRA in DL control information (DCI) scheduling a physical DL shared channel (PDSCH)/physical UL Shared Channel (PUSCH).

Then, the TBS may be determined according to the number of PRBs indicated by the FDRA.

For example, the mapping of virtual resource blocks (VRBs) and PRBs in a BWP is one-to-one. A VRB, which may also be referred as a logical resource block, refers to the resource block indicated by the FDRA in the DCI. The PRB refers to the actual resource block used to transmit data, and a VRB is mapped to a PRB through the mapping relationship. For example, if an interleave operation is not configured, an index of a VRB is the same as that of a PRB, and if the interleave operation is configured, the index f(j) of a PRB is a function of the index j of a VRB.

In accordance with an embodiment of the disclosure, a method is provided for receiving and/or transmitting a PDSCH and/or a PUSCH, respectively.

Although a receiving method of the PDSCH is described below, the method may also be applied to transmitting a PUSCH by replacing the PDSCH with the PUSCH in the method. In addition, although the following description is mainly from the perspective of a UE, the method also includes a BS or other network-side nodes performing corresponding operations.

In addition, for the convenience of description, is the description mainly uses the UE receiving indication information from the BS as an example. However, the UE may also receive the indication information from other network nodes, or receive the indication information from other UEs, or the indication information may be preset or pre-configured.

Figure 5:
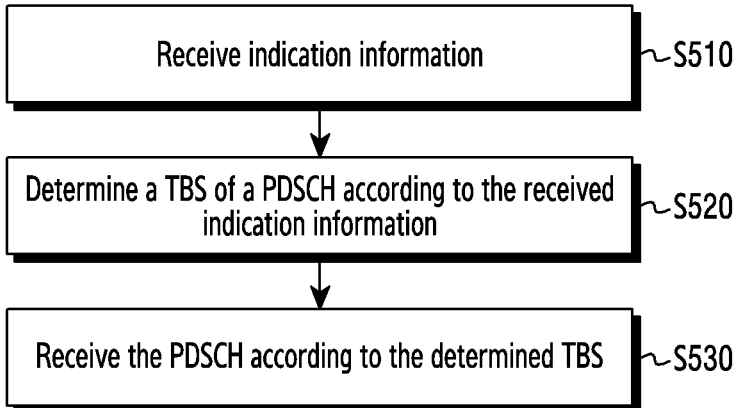
FIG. 5 is a flowchart illustrating a method performed a UE according to an embodiment.

FIG. 5 is a flowchart illustrating a method for receiving a PDSCH according to an embodiment. For example, the method may be implemented at the UE side, Additionally, the method of FIG. 5 may be similarly applied to a UE transmitting the PUSCH. In addition, the BS side may also perform related operations correspondingly. For example, the BS may transmit the indication information r, or may map resources properly to enable the UE side to perform the method.

Referring to FIG. 5, in step S510, the UE receives indication information.

In step S520, the UE determines a TBS of a PDSCH according to the received indication information.

In step S530, the UE receives the PDSCH according to the determined TBS.

The above steps are only used to mark different steps, not to indicate the sequence of steps.

As described above, the UE may receive indication information transmitted by the BS, and then determine the resources (e.g., frequency domain resources) for transmitting the PDSCH according to the indication information (e.g., indication information of frequency domain resources, but not limited to this). Although the descriptions in the disclosure mainly refer to the indication information indicating information about frequency domain resources as an example, this is only for convenience of description, and is not intended to be limiting. Therefore, the methods of this disclosure may also be applied to other types of resources, which are all included in the scope of this application.

The indication information may indicate related information of one or more of DL resources, UL resources, flexible resources, or guard band resources. For example, the indication information may indicate the number and location of one or more of DL resources, UL resources, flexible resources, or guard band resources.

Based on the indication information, the UE may determine which resources may be used for UL transmission and/or which resources may be used for DL transmission.

Alternatively, the indication information may indicate information about available resources and/or indicate information about unavailable resources, so that the UE receiving the indication information may determine available resource information or unavailable resource information.

In the following description, for convenience of description, "the indication information indicates available resources", "the indication information indicates unavailable resources", or "the indication information indicates available or unavailable resources" and similar descriptions are employed. It should be understood that these descriptions are intended to indicate that available resources or unavailable resources may be determined from the indication information, and the content indicated by the indication information may be information related to one of DL resources, UL resources, flexible resources, or guard band resources, or the indication information may also indicate information on available resources, and/or indicate information on unavailable resources. For example, for a PUSCH transmission, the UE may determine which resources are UL resources from the indication information, in order to identify resources that may potentially be used for the PUSCH transmission. For a PDSCH transmission, if the UE determines which resources are UL resources from the indication information, it may know which resources cannot be used for the PDSCH transmission. For example, the UE may know which resources are still available based on the information indicated in the indication information. The indication information may also indicate information about available and/or unavailable resources to the UE in other ways.

The indication information may indicate available frequency domain resources, and is the indication information may also indicate unavailable frequency domain resources.

The indication information may be high-layer signaling configuration information, or information indicated by at least one of media access control (MAC) signaling, physical layer signaling, and a reference signal. The indication information may also be high-layer signaling configuration information, or indicated by any combination of the MAC signaling, the physical layer signaling and the reference signal.

For example, the high-layer signaling configuration information may be semi-static configuration information, and the advantage of employing the semi-static configuration information to indicate available or unavailable frequency domain resources is that this information is reliable, and the BS and UE will not have different understanding on unavailable resources due to unreliable signaling performance.

As another example, the information indicated by the MAC signaling, the physical layer signaling and/or reference signal may be dynamically indicated information, and the advantage of employing dynamic information to indicate unavailable frequency domain resources is that this information is indicated timely, and the unavailable resources may be indicated to the UE more quickly.

The indication information used to determine the unavailable frequency domain resources may be at least one indication information of the high-layer signaling configuration information, information indicated by the media access layer signaling, the physical layer signaling, and the reference signal, i.e., which one of the above indication information is preset or may be determined by the UE according to the indication information provided by the BS.

The UE may receive high-layer signaling configuration information transmitted from the BS, and may determine the unavailable frequency domain resources according to the high-layer signaling configuration information.

If the UE receives the physical layer signaling indication transmitted by the BS, the UE may determine the unavailable frequency domain resources according to the physical layer signaling indication.

If the UE does not receive the physical layer signaling indication transmitted by the BS, but receives the high-layer signaling configuration information transmitted by the BS, the UE may determine the unavailable frequency domain resources according to the high-layer signaling configuration information.

The content of the indication information may be the number and positions of DL PRBs, the number and positions of UL PRBs, the number and positions of flexible PRBs, and/or the number and positions of guard band PRBs.

Unavailable frequency domain resources may be represented by unavailable PRBs or unavailable sub-carriers. The following description refers to unavailable frequency domain resources being represented by unavailable PRBs as an example, but may also be extended to a scenario in which unavailable frequency domain resources are represented by unavailable sub-carriers, or a scenario in which unavailable frequency domain resources are represented by other resource units.

For determining unavailable frequency domain resources according to the received indication information, the following examples are provided.

EXAMPLE 1.1

For a PDSCH, only the indicated DL PRBs are available frequency domain resources, and all but the indicated DL PRBs are unavailable frequency domain resources.

Figure 6:
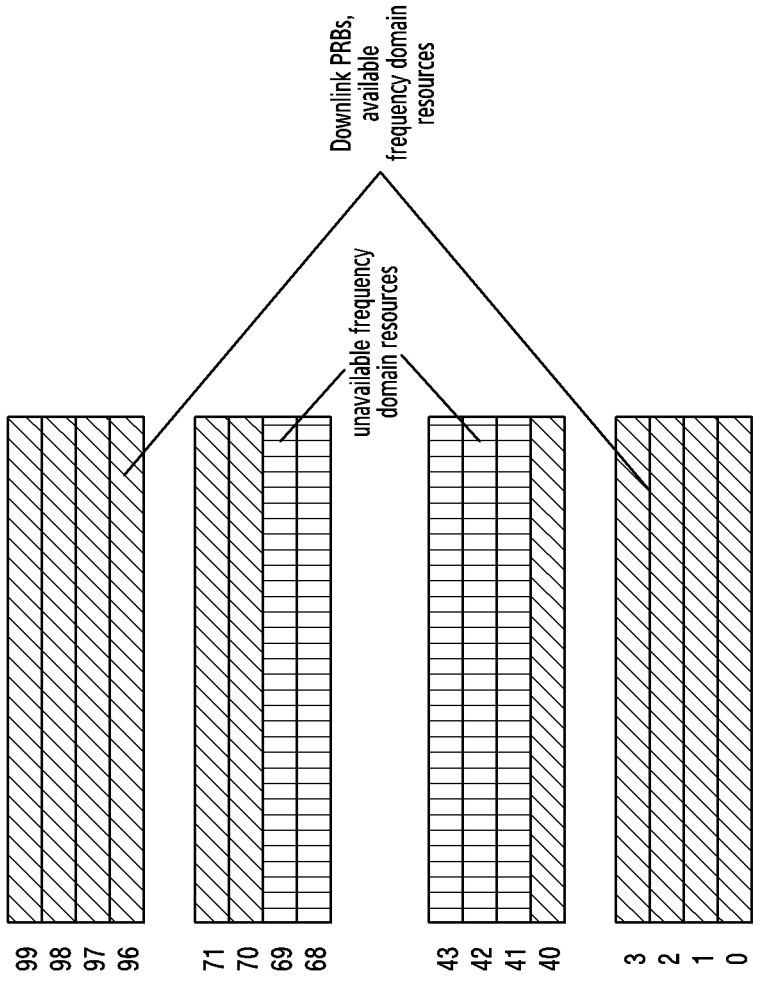
FIG. 6 illustrates available resources and unavailable resources according to an embodiment.

FIG. 6 illustrates available resources and unavailable resources according to an embodiment.

Referring to FIG. 6, a carrier includes 100 PRBs numbered 0-99, where the PRBs numbered 0-40 and 70-99 are DL PRBs, the PRBs numbered 0-40 and 70-99 are available frequency domain resources, and the PRBs numbered 41-69 are unavailable frequency domain resources.

EXAMPLE 1.2

For a PDSCH, the indicated DL PRBs and the indicated flexible PRBs are available frequency domain resources, and all but the indicated DL PRBs and the indicated flexible PRBs are unavailable frequency domain resources.

For example, a carrier includes 100 PRBs numbered 0-99, where PRBs numbered. 0-30 and 80-99 are DL PRBs and PRBs numbered 31-50 are flexible PRBs, PRBs numbered 0-50 and 80-99 are available frequency domain resources, and PRBs numbered 51-79 are unavailable frequency domain resources.

EXAMPLE 1.3

For a PDSCH, the indicated UL PRBs are unavailable frequency domain resources, and all but the indicated UL PRBs are available frequency domain resources. For example, a carrier includes 100 PRBs numbered 0-99, where the PRBs numbered 31-50 are UL PRBs, and the PRBs numbered 0-30 and 51-99 are available frequency domain resources.

EXAMPLE 1.4

For a PDSCH, the indicated UL PRBs and flexible PRBs are unavailable frequency domain resources, and all but the indicated UL PRBs and flexible PRBs are available frequency domain resources. For example, a carrier includes 100 PRBs numbered 0-99, where PRBs numbered 31-50 are UL PRBs and PRBs numbered 35-70 are flexible PRBs, and PRBs numbered 0-30 and 71-99 are available frequency domain resources.

EXAMPLE 1.5

For a PDSCH, the indicated UL PRBs and guard band PRBs are unavailable frequency domain resources, and all but the indicated UL PRBs and guard band PRBs are available frequency domain resources. For example, a carrier includes 100 PRBs numbered. 0-99, where the PRBs numbered 51-70 are UL PRBs, and the PRBs numbered 41-50 and 71-80 are guard band PRBs, and the PRBs numbered 0-40 and 81-99 are available frequency domain resources.

EXAMPLE 2.1

For a PUSCH, only the indicated. UL PRBs are available frequency domain resources, and all but the indicated UL PRBs are unavailable frequency domain resources. For example, a carrier includes 100 PRBs numbered 0-99, where the PRBs numbered 0-40 and 70-99 are UL PRBs, the PRBs numbered 0-40 and 70-99 are available frequency domain resources, and the PRBs numbered 41-69 are unavailable frequency domain resources.

EXAMPLE 2.2

For a PUSCH, the indicated UL PRBs and the indicated flexible PRBs are available frequency domain resources, and all but the indicated. UL PRBs and the indicated flexible PRBs are unavailable frequency domain resources. For example, a carrier includes 100 PRBs numbered of 0-99, where the PRBs numbered 0-30 and 80-99 are UL PRBs and the PRBs numbered 31-50 are flexible PRBs, the PRBs numbered 0-50 and 80-99 are available frequency domain resources, and the PRBs numbered 51-79 are unavailable frequency domain resources.

EXAMPLE 2.3

For a PUSCH, the indicated DL PRBs are unavailable frequency domain resources, and all but the indicated DL PRBs are available, frequency domain resources. For example, a carrier includes 100 PRBs numbered 0-99, where PRBs numbered 31-50 are DL PRBs, and PRBs numbered 0-30 and 51-99 are available frequency domain resources.

EXAMPLE 2.4

For a PUSCH, the indicated DL PRBs and flexible PRBs are unavailable frequency domain resources, and all but the indicated DL PRBs and flexible PRBs are available frequency domain resources. For example, a carrier includes 100 PRBs numbered 0-99, where PRBs numbered 31-50 are DL PRBs and PRBs numbered 35-70 are flexible PRBs, and PRBs numbered 0-30 and 71-99 are available frequency domain resources.

EXAMPLE 2.5

For a PUSCH, the indicated DL PRBs and guard band PRBs are unavailable frequency domain resources, and all but the indicated DL PRBs and guard band PRBs are available frequency domain resources. For example, a carrier includes 100 PRBs numbered 0-99, where PRBs numbered 51-70 are DL PRBs, PRBs numbered 41-50 and 71-80 are guard band PRBs, and PRBs numbered 0-40 and 81-99 are available frequency domain resources.

For convenience of description, the following description refers to the UE receiving the PDSCH as an example. However the method for the UE transmitting the PUSCH is also included in the scope of this disclosure.

The above-described available frequency domain resources are available frequency domain resources in a serving cell (which may also be a carrier or a BWP). The UE receives the PRBs indicated by the FDRA of the scheduled PDSCH (the scheduled PDSCH includes to the PDSCH dynamically scheduled by the DCI, and may also include static and semi-persistent scheduling (SPS) PDSCH). However, it is possible that not all PRBs indicated by the FDRA are PRBs used to transmit the PDSCH, i.e., there are PRBs not used to transmit the PDSCH among the PRBs indicated by the FDRA, and only a part of the PRBs indicated by the FDRA may be used to transmit the PDSCH.

Figure 7:
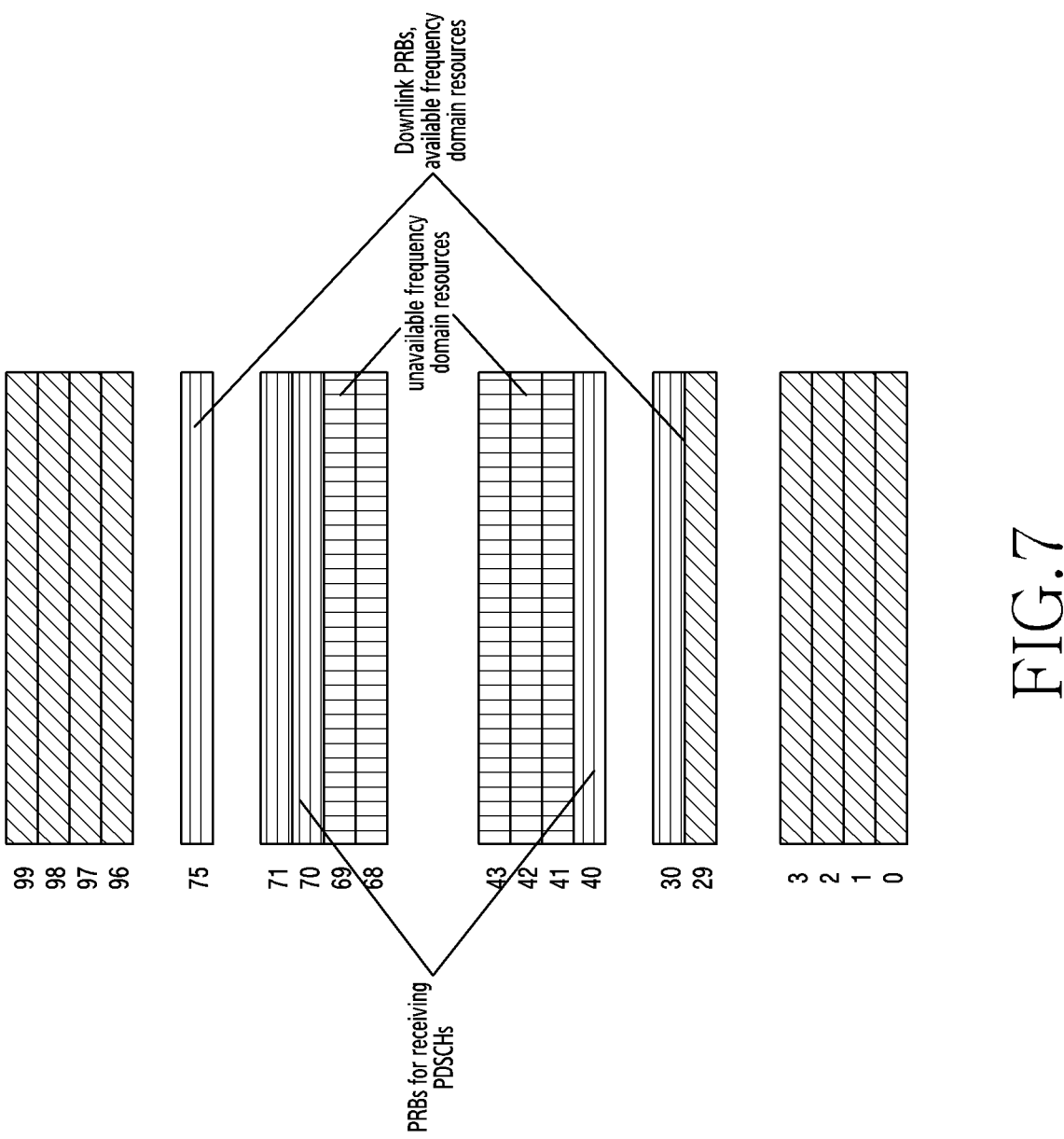
FIG. 7 illustrates available resources and unavailable resources according to an embodiment.

FIG. 7 illustrates available resources and unavailable resources according to an embodiment.

Referring to FIG. 7, a carrier includes 100 PRBs numbered 0-99, where PRBs numbered 0-40 and 70-99 are DL PRBs. If the method in Example 1.1 is employed, PRBs numbered 0-40 and 70-99 are available frequency domain resources, PRBs numbered 41-69 are unavailable frequency domain resources, and the PRBs indicated by the FDRA in the DCI scheduling the PDSCH are PRBs numbered 30-75, then the PRBs numbered 30-40 and 70-75 are PRBs for transmitting the PDSCH since PRBs numbered 41-69 are unavailable frequency domain resources.

For example, a method of calculating the TBS includes determining the number of REs in a PRB that transmits the PDSCH using Equation (1).

$$N'_{RE} = N^{RB}_{SC} \cdot N^{sh}_{symb} - N^{PRB}_{DMRS} - N^{PRB}_{oh} \tag{1}$$

In Equation (1), $$N^{PRB}_{oh}$$

is the number of REs in a PRB for overhead, $$N^{PRB}_{DMRS}$$

is the number of REs in a PRB occupied by a demodulation reference signal (DMRS), $$N^{RB}_{sc}$$

equals to 12, which is the number of subcarriers in a PRB, and $$N^{sh}_{symb}$$

is the number of DM symbols in a slot allocated to the PDSCH.

The number of REs in all PRBs for the scheduled PDSCH is determined using Equation (2).

$$N_{RC} = \min(156, N_{RE}) \cdot n_{PRB} \qquad (2)$$

In Equation (2), $n_{PRB}$ is the number of PRBs indicated by the FDRA in the DCI scheduling the PDSCH, and it may also be the total number of PRBs allocated to the UE.

According to the number of REs $N_{RE}$ in all PRBs for the scheduled PDSCH, the number of non-quantized information bits is determined using Equation (3).

$$N_{info} = N_{RE} \cdot R \cdot Q_m \cdot \upsilon \qquad (3)$$

In Equation (3), R is target code rate, $Q_m$ is modulation order, and v is the number of layers.

The number of the non-quantized information bits $N_{info}$ are quantized to obtain the number $$N'_{info}$$

of the information bits of the PDSCH transmission.

The above-described method of calculating $$N'_{info}$$

is based on an assumption that all PRBs indicated by the FDRA in the DCI scheduling the PDSCH may be used to transmit the PDSCH. However, if there are PRBs indicated by FDRA in the DCI scheduling the PDSCH that cannot be used to transmit the PDSCH, the following method may be used to calculate $$N'_{info}.$$

More specifically, the calculation method includes determining the number of REs in a PRB that transmits the PDSCH according to Equation (1).

$$N'_{RE} = N_{SC}^{RB} \cdot N_{symb}^{sh} - N_{DMRS}^{PRB} - N_{oh}^{PRB} \qquad (1)$$

In Equation (1), $$N_{oh}^{PRB}$$

is the number of REs in a PRB for overhead;

$$N_{DMRS}^{PRB}$$

is the number of REs in a PRB occupied by demodulation reference signal DMRS;

$$N_{sc}^{RB}$$

equals to 12, which is the number of subcarriers in a PRB; and $$N_{symb}^{sh}$$

is the number of OFDM symbols in a slot allocated to the PDSCH.

Thereafter, the number of REs $$N_{RE}^{ava}$$

in all PRBs for the scheduled PDSCH that may be used for PDSCH transmission is determined-using Equation (4).

$$N_{RE}^{ava} = \min(156, N'_{RC}) \cdot n'_{PRB} \qquad (4)$$

In Equation (4), $n_{PRB}'$ is the number of PRBs indicated by the FDRA in the DCI scheduling the PDSCH, minus the number of PRBs that cannot be used for the PDSCH.

According to the number of REs $$N_{RE}^{ava}$$

in all PRBs for the scheduled PDSCH that may be used to transmit the PDSCH, the number of the non-quantized information bits is then determined using Equation (5).

$$N_{info} = N_{RE}^{ava} \cdot R \cdot Q_m \cdot v \qquad (5)$$

In Equation (5), R is target code rate, $Q_m$ is modulation order, and v is the number of layers.

The number of non-quantized information bits $N_{info}$ is then quantized to obtain the number $$N'_{info}$$

of the information bits of the PDSCH transmission, and then obtain the corresponding TBS.

As described above, the UE receives the indication information transmitted by the BS, and then determines the frequency domain resources for transmitting the PDSCH according to the indication information of frequency domain resources.

The indication information may be high-layer signaling configuration information, or information indicated by at least one of MAC layer signaling, the physical layer signaling, or the reference signal.

The high-layer signaling configuration information may be semi-static configuration information, An advantage of employing the semi-static configuration information to indicate unavailable frequency domain resources is that this information is reliable, and different understanding on unavailable resources between the BS and the UE will not be caused.

The information indicated by the physical layer signaling and the reference signal may be dynamically indicated information. An advantage of employing dynamic information to indicate unavailable frequency domain resources is that this information is indicated timely, and the unavailable resources may be indicated to the UE relatively quickly.

In addition, the performance of indicating the indication information by employing the MAC layer signaling falls between the performance of indicating the indication information using the high-layer signaling configuration information and the performance of indicating the indication information by using the physical layer signaling or the reference signal.

The indication information used to determine the unavailable frequency domain resources may include indication information of the high-layer signaling configuration information, information indicated by one of the media access layer signaling, the physical layer signaling, and/or the reference signal, i.e., which One of the above the indication information is preset or may be determined by the UE according to the indication information provided by the BS.

For example, if the UE receives the high-layer signaling configuration information transmitted by the BS, the UE may determine the unavailable frequency domain resources according to the high-layer signaling configuration information. If the UE receives the physical layer signaling indication transmitted by the BS, the UE may determine the unavailable frequency domain resources according to the physical layer signaling indication. If the UE receives the physical layer signaling indication transmitted by the BS, the UE may determine the unavailable frequency domain resources according to the physical layer signaling indication. If the UE does not receive the physical layer signaling indication transmitted by the BS, and the UE receives the high-layer signaling configuration information transmitted by the BS to the UE, the UE may determine the unavailable frequency domain resources according to the high-layer signaling configuration information.

The indication information may indicate the number and positions of DL PRBs, the number and positions of UL PRBs, the number and positions of flexible PRBs, and/or the number and positions of guard band PRBs.

Unavailable frequency domain resources may be represented by unavailable PRBs or other resource units (e.g., subcarriers). Here, it is described by taking unavailable frequency domain resources being represented by unavailable PRBs as an example. The method of determining unavailable PRBs may be determined by the method in an embodiment.

The UE may receive information or a configuration related to resource mapping mode from the BS or other nodes, or be preset or pre-configured with the information or configuration related to resource mapping mode, so that when performing the mapping of VRBs to PRBs, the VRBs may be directly mapped to the PRBs available for transmission according to the indication information.

Based on the information or configuration related to the resource mapping mode, when the UE maps the VRBs indicated by the FDRA in the DCI scheduling the PDSCH to the PRBs, it may be considered that the BS has removed the unavailable PRBs when mapping the PRBs, i.e., the VRBs are only mapped to the available PRBs and not to the unavailable PRBs.

For example, a carrier includes 100 PRBs numbered 0-99, where PRBs numbered 0-40 and 70-99 are DL PRBs. If the method in Example 1.1 above is employed, PRBs 10 numbered 0-40 and 70-99 are available frequency domain resources, and PRBs numbered 41-69 are unavailable frequency domain resources. It is assumed for the UE that the DL BWP configured in advance, and the semi-static signaling contains 71 PRBs in total, numbered 10-80 where PRBs numbered 41-69 are unavailable frequency domain resources, and PRBs numbered 10-40 and 70-80 are available frequency domain resources.

In the signal configuring the DL BWP for a PDSCH transmission of the UE, the sequence numbers of the PRBs are changed to 0-70 (the sequence numbers of the PRBs refer to the sequence numbers in the DL BWP configured for the UE, e.g., sequence number 0 corresponds to PRB sequence number 10 in the configured DL BWP, and sequence number 70 corresponds to PRB sequence number 80 in the configured DL BWP). Following the sequence numbers, the sequence numbers of unavailable PRBs become 31-59 correspondingly. Therefore, the available PRB numbers in the configured DL BWP are 0-30 and 60-70, with 42 PRBs in total, and the VRB numbers in the configured DL BWP are 0-41.

Figure 8:
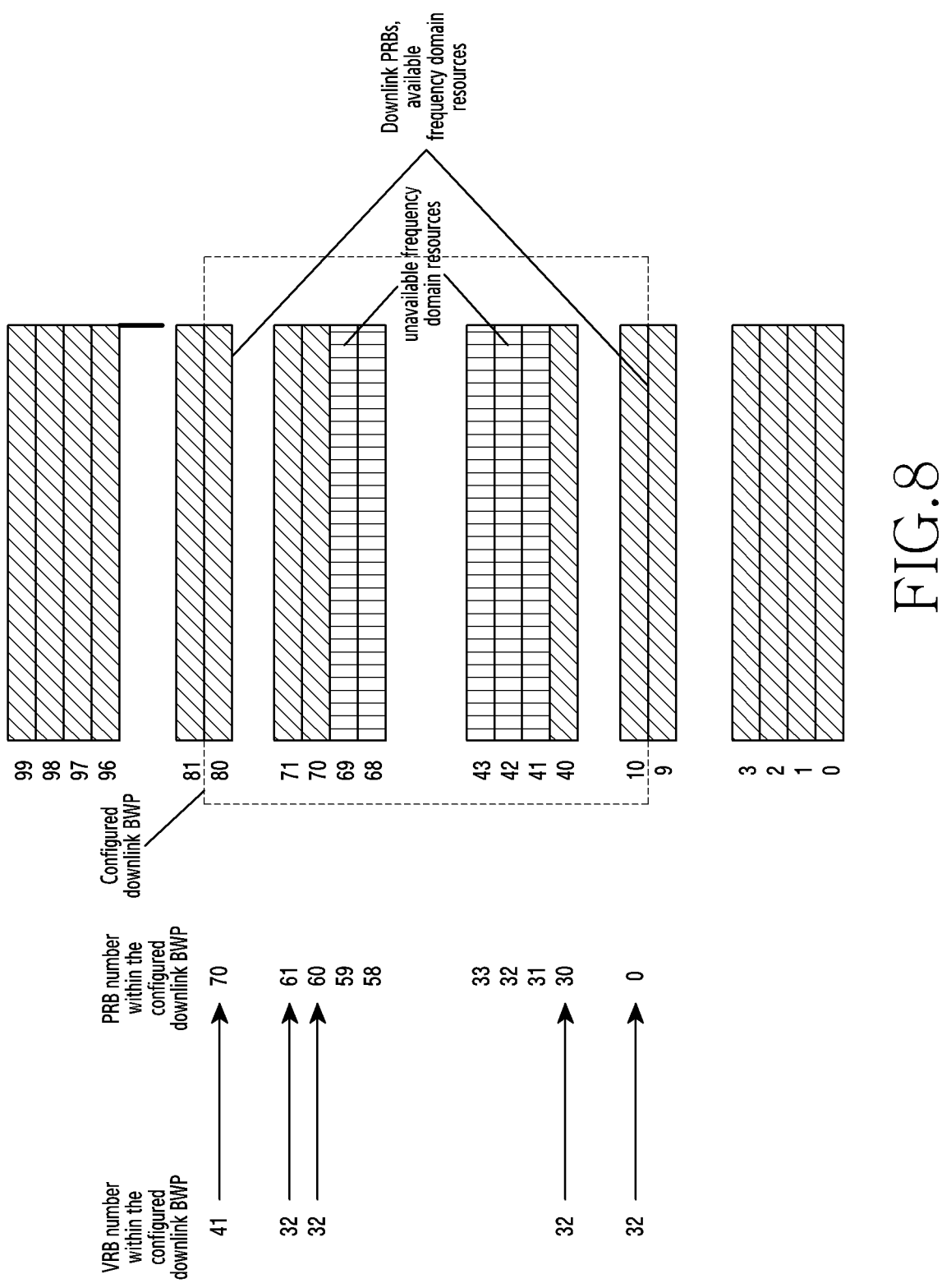
FIG. 8 illustrates available resources and unavailable resources and resource mapping according to an embodiment.

FIG. 8 illustrates available resources and unavailable resources and resource mapping according to an embodiment.

Referring to FIG. 8, in the DL BWP, the mapping relationship between VRBs and PRBs are VRB 0→PRB 0, . . . , VRB 30→PRB 30, VRB 31→PRB 60, . . . , VRB 41→PRB 70. An advantage of employing this method is that the PRBs scheduled by the DCI are all available PRBs, which makes it easier and more precise to calculate the TBS. With this method, the BS maps the VRBs to the available PRBs, and the UE receiving the DCI directly maps the VRBs indicated by the FDRA in the DCI to the available PRBs according to the indication information received from the BS indicating the available or unavailable frequency domain resources, so that the PDSCH may be properly received.

When the UE transmits the PUSCH, by employing a similar method, the UE may map the VRBs indicated in the DCI to available PRBs to transmit the PUSCH according to the received indication information indicating available or unavailable frequency domain resources.

For the BS, in addition to transmitting the indication information indicating available or unavailable frequency domain resources to the UE, VRBs are mapped to available PRBs while the DCI is being transmitted, so all the VRBs indicated by the DCI received by the UE are available resources, which may also reduce the number of bits is indicating the resources and reduce the complexity of the UE.

The following method may be employed to calculate the TBS.

The number of REs in a PRB that transmits the PDSCH is determined as:

$$N'_{RE} = N_{sc}^{RB} \cdot N_{symb}^{sh} - N_{DMRS}^{PRB} - N_{oh}^{PRB},$$

wherein $$N_{oh}^{PRB}$$

is the number of REs in a PRB for overhead;

$$N_{DMRS}^{PRB}$$

is the number of REs in a PRB occupied by demodulation reference signal DMRS;

$$N_{sc}^{RB}$$

equals to 12, which is the number of subcarriers in a PRB; and $$N_{symb}^{sh}$$

is the number of OFDM symbols in a slot allocated to the PDSCH.

The number of REs in all PRBs for the scheduled PDSCH is determined as:

$$N_{RE} = \min(156, N'_{RE}) \cdot n_{PRB},$$

wherein $n_{PRB}$ is the number of PRBs indicated by FDRA in the DCI scheduling the PDSCH.

According to the number of REs $N_{RE}$ in all PRBs for the scheduled PDSCH, the number of non-quantized information bits is determined as:

$$N_{info} = N_{RE} \cdot R \cdot Q_m \cdot v,$$

wherein R is target code rate, $Q_m$ is modulation order, and v is the number of layers.

Quantize the number of the non-quantized information bits $N_{info}$ to obtain the number $$N'_{info}$$

of information bits of the PDSCH transmission.

As described above, the UE may receive the indication information transmitted by is the BS, and then calculate the TBS of the PDSCH according to the indication information.

The indication information may be indicated by the high-layer signaling configuration information, the media access layer signaling, and/or the physical layer signaling.

In an example, the indication information may indicate a weighting factor alpha. The weighting factor may be used to determine the transmission block size TBS, as follows:

the number of REs in a PRB that transmits the PDSCH is determined as:

$$N'_{RE} = N_{sc}^{RB} \cdot N_{symb}^{sh} - N_{DMRS}^{PRB} - N_{oh}^{PRB},$$

wherein $$N_{oh}^{PRB}$$

is the number of REs in a PRB for overhead;

$$N_{DMRS}^{PRB}$$

is the number of REs in a PRB occupied by demodulation reference signal DMRS;

$$N_{sc}^{RB}$$

equals to 12, which is the number of subcarriers in a PRB; and $$N_{symb}^{sh}$$

is the number of OFDM symbols in a slot allocated to the PDSCH.

The number of REs in all PRBs for the scheduled. PDSCH is determined as:

$$N_{RE} = \min(156, N'_{RE}) \cdot n_{PRB},$$

wherein $n_{PRB}$ is the number of PRBs indicated by EDRA in DCI scheduling the PDSCH.

According to the number of REs $N_{RE}$ in all PRBs for the scheduled PDSCH, the number of non-quantized information bits is then determined using Equation (6).

$$N_{info} = N_{RE} \cdot R \cdot Q_m \cdot v \cdot \text{alpha} \tag{6}$$

In Equation (6), R is target code rate, $Q_m$ is modulation order; v is the number of layers, and alpha is the weighting factor.

The number of the non-quantized information bits $N_{info}$ is then quantized to obtain the number $$N'_{info}$$

of information bits of the PDSCH transmission.

Accordingly, the PDSCH may be scheduled by the DCI of a UE-specific search space.

According to the above-described methods, the TBS of the received PDSCH may be simply and precisely calculated.

Figure 9:
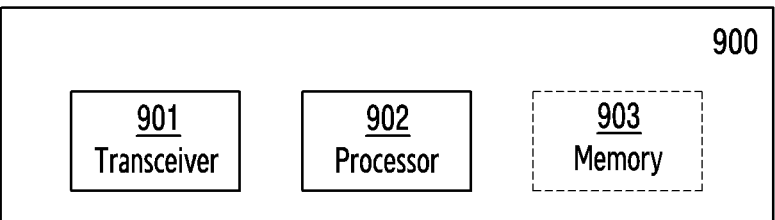
FIG. 9 illustrates a communication device according to according to an embodiment.

FIG. 9 illustrates a communication device 900 according to an embodiment. For example, the communication device 900 may be configured to implement any one or more of the above-described methods of the present disclosure. Therefore, it should be understood that the communication device 900 may be the UE or the BS described in this disclosure or a part thereof. It should be understood that the BS may be a 5G BS (e.g., a gNB, or an ng-eNB) or a 4G BS (e.g., an eNB), or other types of access nodes, or the part of the BS may be, e.g., a distribution unit (DU), a centralized unit (CU), a control plane part of the CU, a user plane part of the CU, etc.

Referring to FIG. 9, the communication device 900 includes a transceiver 901, a processor 902, and a memory 903.

The transceiver 901 is configured to receive and/or transmit signals.

The processor 902 is operatively connected to the transceiver 901 and/or the memory 903. The processor 902 may be implemented as one or more processors for operating according to any of the above-described methods of the present disclosure.

The memory 903 is configured to store computer programs and data. The memory 903 may include a non-transitory memory for storing operations and/or code instructions executable by the processor 902. The memory 903 may include non-transitory programs and/or instructions readable by the processor that, when executed, cause the processor 902 to implement the steps of any of the above-described methods of the present disclosure. The memory 903 may include RAM or buffer(s) to store intermediate processing data from various functions performed by the processor 902.

Figure 10:
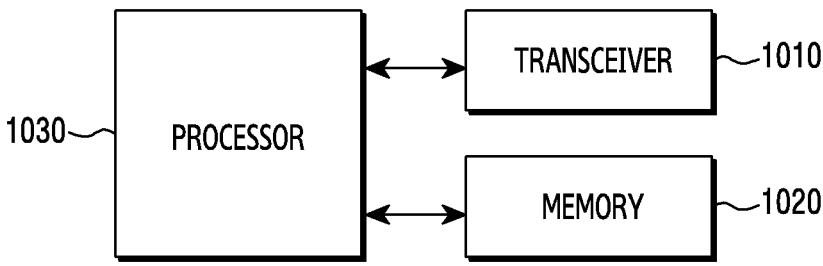
FIG. 10 illustrates a UE according to an embodiment.

FIG. 10 illustrates a UE according to an embodiment.

Referring to FIG. 10, the UE includes a transceiver 1010, a memory 1020, and a processor 1030. The transceiver 1010, the memory 1020, and the processor 1030 of the UE may operate according to any of the above-described methods of the UE. However, the components of the UE are not limited thereto. For example, the UE may include more or fewer components than those described above. In addition, the processor 1030, the transceiver 1010, and the memory 1020 may be implemented as a single chip. Also, the processor 1030 may include at least one processor. Furthermore, the UE of FIG. 10 corresponds to the UEs of the FIG. 1.

The transceiver 1010 collectively refers to a UE receiver and a UE transmitter, and may transmit/receive a signal to/from a BS or a network entity. The signal transmitted or received to or from the BS or a network entity may include control information and data. The transceiver 1010 may include an RF transmitter for up-converting and amplifying a frequency of a transmitted signal, and an RF receiver for amplifying low-noise and down-converting a frequency of a received signal. However, this is only an example of the transceiver 1010 and components of the transceiver 1010 are not limited to the RF transmitter and the RF receiver.

The transceiver 1010 may receive and output, to the processor 1030, a signal through a wireless channel, and transmit a signal output from the processor 1030 through the wireless channel.

The memory 1020 may store a program and data for operations of the UE. The memory 1020 may store control information or data included in a signal obtained by the UE. The memory 1020 may be a storage medium, such as ROM, RAM, a hard disk, a compact disc (CD)-ROM, a digital versatile disc (DVD), or a combination of storage media.

The processor 1030 may control a series of processes such that the UE operates as described above. For example, the transceiver 1010 may receive a data signal including a control signal transmitted by the BS or the network entity, and the processor 1030 may determine a result of receiving the control signal and the data signal transmitted by the BS or the network entity.

Figure 11:
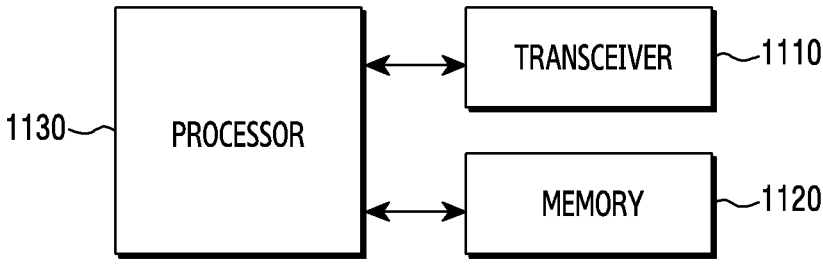
FIG. 11 illustrates a BS according to an embodiment.

FIG. 11 illustrates a BS according to an embodiment. Referring to FIG. 11, the BS includes a transceiver 1110, a memory 1120, and a processor 1130. The transceiver 1110, the memory 1120, and the processor 1130 of the BS may operate according to any of the above-described methods of the BS. However, the components of the BS are not limited thereto. For example, the BS may include more or fewer components than those described above. In addition, the processor 1130, the transceiver 1110, and the memory 1120 may be implemented as a single chip. The processor 1130 may include at least one processor. Furthermore, the base station of FIG. 11 may correspond to the base station 102 and/or base station 103.

The transceiver 1110 collectively refers to a BS receiver and a BS transmitter, and may transmit/receive a signal to/from a terminal (or UE) or a network entity. The signal transmitted or received to or from the terminal or a network entity may include control information and data. The transceiver 1110 may include an RE transmitter for up-converting and amplifying a frequency of a transmitted signal, and an RE receiver for amplifying low-noise and down-converting a frequency of a received signal. However, this is only an example of the transceiver 1110 and components of the transceiver 1110 are not limited to the RE transmitter and the RF receiver.

The transceiver 1110 may receive and output, to the processor 1130, a signal through a wireless channel, and transmit a signal output from the processor 1130 through the wireless channel.

The memory 1120 may store a program and data required for operations of the BS. The memory 1120 may store control information or data included in a signal obtained by the BS. The memory 1120 may be a storage medium, such as ROM, RAM, a hard disk, a CD-ROM, a DVD, or a combination of storage media.

The processor 1130 may control a series of processes such that the BS operates as described above. For example, the transceiver 1110 may receive a data signal including a control signal transmitted by the terminal, and the processor 1130 may determine a result of receiving the control signal and the data signal transmitted by the terminal.

According to an embodiment of disclosure, a method is provided for a UE in a communication system. The method includes receiving indication information related to a TBS, and determining the TBS according to the indication information.

The indication information indicates at least one of the following: the number and positions of DL resources, the number and positions of UL resources, the number and positions of flexible resources, and the number and positions of guard band resources.

The method further includes determining resources available for transmission in the scheduled resources based on the indication information, wherein determining the TBS according to the indication information comprises determining the TBS according to the number of the resources available for transmission.

The DL resources indicated by the indication information are resources available for transmission, the DL resources and flexible resources indicated by the indication information are resources available for transmission, the UL resources indicated by the indication information are resources unavailable for transmission, the UL resources and flexible resources indicated by the indication information are resources unavailable for transmission, the UL resources and guard band resources indicated by the indication information are resources unavailable for transmission.

The UL resources indicated by the indication information are resources available for transmission, the UL resources and flexible resources indicated by the indication information are resources available for transmission, the DL resources indicated by the indication information are resources unavailable for transmission, the DL resources and flexible resources indicated by the indication information are resources unavailable for transmission, the DL resources and guard band resources indicated by the indication information are resources unavailable for transmission.

The method further includes receiving information related to a mapping mode; and determining physical resources mapped by the scheduled virtual resources according to the indication information based on the information related to the mapping mode.

Determining the TBS according to the indication information includes determining the TBS according to the number of mapped physical resources.

The indication information indicates a weighting factor of the TBS.

The indication information is indicated via at least one of high-layer signaling configuration information, media access layer signaling, physical layer signaling, or a reference signal.

According to an embodiment of the disclosure, a method is provided for a BS in a communication system. The method includes transmitting, to a UE, indication information related to a TBS, wherein the indication information is used by the UE to determine the TBS.

The indication information indicates at least one of the following: the number and positions of DL resources, the number and positions of UL resources, the number and positions of flexible resources, and the number and positions of guard band resources.

The method further includes transmitting, to the UE, information related to a mapping mode.

The method further includes determining resources available for transmission in the resources configured for the UE based on the indication information, and mapping virtual resources based on the number and locations of the resources available for transmission.

The indication information indicates a weighting factor of the TBS.

The indication information is indicated via at least one of high-layer signaling configuration information, media access layer signaling, physical layer signaling, or a reference signal.

According to an embodiment of the disclosure, a UE is provided for use in a communication system. The UE includes a transceiver configured to transmit and receive signals; and a controller coupled to the transceiver and configured to perform the operations in the method according to embodiments of the present application.

According to an embodiment of the disclosure, a stations is provided for use in a communication system. The BS includes a transceiver configured to transmit and receive signals; and a controller coupled to the transceiver and configured to perform the operations in the method according to embodiments of the present application.

In accordance with the above-described methods and devices of disclosure, it is possible to more precisely allocate appropriate frequency domain resources for data, and better guarantee the transmission or reception performance of data.

According to an embodiment, a method performed by a user equipment (UE) in a wireless communication system is provided. The method comprises receiving indication information related to a transmission block size (TBS) and determining the TBS based on the indication information.

The indication information indicates at least one of a number and positions of downlink resources, a number and positions of uplink resources, a number and positions of flexible resources, or a number and positions of guard band resources.

The method further comprises determining a number of resources available for transmission based on the indication information. The determining of the TBS based on the indication information comprises determining the TBS based on the number of the resources available for transmission.

The method further comprises receiving information related to a mapping mode and determining physical resources mapped by scheduled virtual resources based on the indication information based on the information related to the mapping mode.

The determining of the TBS based on the indication information comprises determining the TBS based on a number of mapped physical resources.

According to an embodiment, a method performed by a base station (BS) in a wireless communication system is provided. The method comprises transmitting, to a user-equipment (UE), indication information related to a transmission block size (TBS). The indication information is used by the UE to determine the TBS.

The indication information indicates at least one of a number and positions of downlink resources, a number and positions of uplink resources, a number and positions of flexible resources, or a number and positions of guard band resources.

The method further comprises transmitting, to the UE, information related to a mapping mode.

The method further comprises determining resources available for transmission in resources configured for the UE based on the indication information and determining mapping virtual resources based on a number and locations of the resources available for transmission.

The indication information is indicated via at least one of high-layer signaling configuration information, media access control layer signaling, physical layer signaling, or a reference signal.

According to an embodiment, a user equipment (UE) comprises a transceiver; and a controller coupled to the transceiver and configured to receive indication information related to a transmission block size (TBS), and determine the TBS based on the indication information.

The indication information indicates at least one of a number and positions of downlink resources, a number and positions of uplink resources, a number and positions of flexible resources, or a number and positions of guard band resources.

The controller is further configured to determine a number of resources available for transmission based on the indication information, and determine the TBS based on the number of the resources available for transmission.

The controller is further configured to receive information related to a mapping mode, and determine physical resources mapped by scheduled virtual resources based on the indication information based on the information related to the mapping mode.

The controller is further configured to determine the TBS based on a number of mapped physical resources.

A base station (BS) comprises a transceiver and a controller coupled to the transceiver and configured to transmit, to a user equipment (UE), indication information related to a transmission block size (TBS). The indication information is used by the UE to determine the TBS.

The indication information indicates at least one of a number and positions of downlink resources, a number and positions of uplink resources, a number and positions of flexible resources, or a number and positions of guard band resources.

The controller is further configured to transmit, to the UE, information related to a mapping mode.

The controller is further configured to determine resources available for transmission in resources configured for UE based on the indication information and determine mapping virtual resources based on a number and locations of the resources available for transmission.

The indication information is indicated via at least one of high-layer signaling configuration information, media access control layer signaling, physical layer signaling, or a reference signal.

Those of ordinary skill in the art will recognize that the description of the methods related to transmission resource determination of the present disclosure is only illustrative, and is not intended to be limiting in any way. Other embodiments will be readily apparent to those of ordinary skill in the art having the benefit of this disclosure.

For clarity, not all conventional features of the embodiments of the method and device related to transmission resource determination of the present disclosure are shown and described. Of course, it should be understood that in the development of any such actual implementation of the method and device related to transmission resource determination, many implementation-specific decisions may need to be made in order to achieve the developers' specific goals, such as compliance with the constraints related to applications, systems, networks and businesses, and these specific goals will vary from implementation to implementation and from developer to developer.

The modules, processing operations and/or data structures described according to the present disclosure may be implemented using various types of OSs, computing platforms, network devices, computer programs and/or general-purpose machines. In addition, those of ordinary skill in the art will realize that less general-purpose devices such as hard-wired devices, a field programmable gate array (FPGA), an application specific integrated circuits (ASIC), etc., may also be used. When a method including a series of operations and sub-operations is implemented by a processor, computer or machine, and those operations and sub-operations may be stored as a series of non-transitory code instructions readable by the processor, computer or machine, they may be stored on tangible and/or non-transitory media.

The modules of the method and device related to transmission resource determination described herein may include software, firmware, hardware or any combination of software, firmware or hardware suitable for the purpose described herein.

In the method related to transmission resource determination described herein, various operations and sub-operations may be performed in various orders, and some of the operations and sub-operations may be optional.

Although the foregoing disclosure of this application has been made through non-limiting illustrative embodiments, these embodiments may be modified arbitrarily within the scope of the appended claims without departing from the spirit and essence of this disclosure.

Those skilled in the art will understand that various illustrative logical blocks, modules, circuits, and steps described in this application may be implemented as hardware, software, or combinations of both. To clearly illustrate this interchangeability between hardware and software, various illustrative components, blocks, modules, circuits, and steps are generally described above in the form of their functional sets. Whether such a function set is implemented as hardware or software depends on the specific application and the design constraints imposed on the overall system. Technicians may implement the described set of functions in different ways for each specific application, but such design decisions should not be interpreted as causing a departure from the scope of this application.

The various illustrative logic blocks, modules, and circuits described in this application may be implemented or executed with a general purpose processor, a digital signal processor (DSP), an ASIC, an FPGA or other programmable logic devices, discrete gate or transistor logic, discrete hardware components, or any combination thereof designed to perform the functions described herein. The general-purpose processor may be a microprocessor, but in the alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be directly embodied in hardware, in a software module executed by a processor, or in a combination of both. The software modules may reside in RAM, flash memory, ROM, erasable programmable ROM (EPROM), electrically EPROM (EEPROM), registers, hard disks, removable disks, or any other form of storage media known in the art. An exemplary, storage medium is coupled to the processor so that the processor may read and write information from to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

In one or more exemplary designs, the functions may be implemented in hardware, software, firmware, or any combination thereof. If implemented in software, each function may be stored on or transmitted by a computer-readable medium as one or more instructions or codes. Computer readable media include both computer storage media and communication media, the latter including any media that facilitates the transfer of computer programs from one place to another. Storage media may be any available media that may be accessed by general-purpose or special-purpose computers.

The embodiments of this application are only for easy description and help to fully understand this application, and are not intended to limit the scope of this application. Therefore, it should be understood that, except for the embodiments disclosed herein, all modifications and changes or forms of modifications and changes derived from the technical concept of this application fall within the scope of this application.

The above are only preferred embodiments of the present invention, and they are not intended to limit the present invention. Any modification, equivalent replacement, improvement, etc, made within the spirit and principle of the present invention should be included in the scope of protection of the present invention.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE), the method comprising:

receiving, from a base station, first downlink control information (DCI) for scheduling a physical downlink shared channel (PDSCH), wherein the first DCI includes first frequency domain resource assignment (FDRA) information;

identifying a first total number of resource elements (REs) for the PDSCH, based on multiplying a minimum of 156 and a number of REs for the PDSCH in a physical resource block (PRB) by a first number of first PRBs minus a second number of second PRBs among the first PRBs, wherein the first PRBs are identified based on the first FDRA information, and wherein the second PRBs are not used for the PDSCH; and identifying a first transport block size (TBS) for the PDSCH based on the first total number.

2. The method of claim 1, further comprising:

receiving, from the base station, a second DCI for scheduling a physical uplink shared channel (PUSCH), wherein the second DCI includes second FDRA information;

identifying a second total number of REs for the PUSCH, using a third number of third PRBs minus a fourth number of fourth PRBs among the third PRBs, wherein the third PRBs are identified based on the second FDRA information and wherein the fourth PRBs are not used for the PUSCH; and identifying a second TBS for the PUSCH based on the second total number.

3. A method performed by a base station, the method comprising:

transmitting, to a user equipment (UE), first downlink control information (DCI) for scheduling a physical downlink shared channel (PDSCH), wherein the first DCI includes first frequency domain resource assignment (FDRA) information; and transmitting, to the UE, the PDSCH, wherein a first total number of resource elements (REs) for the PDSCH is based on multiplying a minimum of 156 and a number of REs for the PDSCH in a physical resource block (PRB) by a first number of first PRBs minus a second number of second PRBs among the first PRBs, wherein the first PRBs are indicated by the first FDRA information, wherein the second PRBs are not used for the PDSCH, and wherein a first transport block size (TBS) for the PDSCH is based on the first total number.

4. The method of claim 3, further comprising:

transmitting, to the UE, a second DCI for scheduling a physical uplink shared channel (PUSCH), wherein the second DCI includes second FDRA information; and receiving, from the UE, the PUSCH, wherein a second total number of REs for the PUSCH is based on a third number of third PRBs minus a fourth number of fourth PRBs among the third PRBs, wherein the third PRBs are indicated by the second FDRA information, wherein the fourth PRBs are not used for the PUSCH, and wherein a second TBS for the PUSCH is based on the second total number.

5. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to receive, from a base station, first downlink control information (DCI) for scheduling a physical downlink shared channel (PDSCH), wherein the first DCI first frequency domain resource assignment (FDRA) information, identify a first total number of resource elements (REs) for the PDSCH, based on multiplying a minimum of 156 and a number of REs for the PDSCH in a physical resource block (PRB) by a first number of first PRBs minus a second number of second PRBs among the first PRBs, wherein the first PRBs are identified based on the first FDRA information and wherein the second PRBs are not used for the PDSCH, and identify a first transport block size (TBS) for the PDSCH based on the first total number.

6. The UE of claim 5, wherein the instructions further cause the UE to:

receive, from the base station, a second DCI for scheduling a physical uplink shared channel (PUSCH), wherein the second DCI includes second FDRA information, identify a second total number of REs for the PUSCH, using a third number of third PRBs minus a fourth number of fourth PRBs among the third PRBs, wherein the third PRBs are identified based on the second FDRA information and wherein the fourth PRBs are not used for the PUSCH, and identify a second TBS for the PUSCH based on the second total number.

7. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a user equipment (UE), first downlink control information (DCI) for scheduling a physical downlink shared channel (PDSCH), wherein the first DCI includes first frequency domain resource assignment (FDRA) information, and transmit, to the UE, the PDSCH, wherein a first total number of resource elements (REs) for the PDSCH is based on multiplying a minimum of 156 and a number of REs for the PDSCH in a physical resource block (PRB) by a first number of first PRBs minus a second number of second PRBs among the first PRBs, wherein the first PRBs are indicated by the first FDRA information, wherein the second PRBs are not used for the PDSCH, and wherein a first transport block size (TBS) for the PDSCH is based on the first total number.

8. The base station of claim 7, wherein the instructions further cause the base station to:

transmit, to the UE, a second DCI for scheduling a physical uplink shared channel (PUSCH), wherein the second DCI includes second FDRA information, and receive, from the UE, the PUSCH, wherein a second total number of REs for the PUSCH is based on a third number of third PRBs minus a fourth number of fourth PRBs among the third PRBs, wherein the third PRBs are indicated by the second FDRA information, wherein the fourth PRBs are not used for the PUSCH, and wherein a second TBS for the PUSCH is based on the second total number.

9. The method of claim 1, wherein a reception of the PDSCH is associated with symbols for full-duplex.

10. The method of claim 3, wherein a transmission of the PDSCH is associated with symbols for full-duplex.

11. The UE of claim 5, wherein a reception of the PDSCH is associated with symbols for full-duplex.

12. The base station of claim 7, wherein a transmission of the PDSCH is associated with symbols for full-duplex.

\* \* \* \* \*